United States Patent
Stepanov

(10) Patent No.: US 9,417,768 B2
(45) Date of Patent: Aug. 16, 2016

(54) METHOD FOR THREE-DIMENSIONAL VIEWING

(75) Inventor: Vadym Stepanov, Kharkov (UA)

(73) Assignee: LULU SOFTWARE LIMITED, Ta'Xbiex (MT)

( * ) Notice: Subject to any disclaimer, the term of this patent is extended or adjusted under 35 U.S.C. 154(b) by 47 days.

(21) Appl. No.: 13/976,047

(22) PCT Filed: Mar. 14, 2012

(86) PCT No.: PCT/IB2012/000598
§ 371 (c)(1),
(2), (4) Date: Jun. 26, 2013

(87) PCT Pub. No.: WO2012/131464
PCT Pub. Date: Oct. 4, 2012

(65) Prior Publication Data
US 2014/0013267 A1   Jan. 9, 2014

Related U.S. Application Data

(60) Provisional application No. 61/453,590, filed on Mar. 17, 2011.

(51) Int. Cl.
*G06F 3/048* (2013.01)
*G06F 3/0483* (2013.01)
*G06F 3/147* (2006.01)

(52) U.S. Cl.
CPC .............. *G06F 3/0483* (2013.01); *G06F 3/147* (2013.01); *G09G 2340/14* (2013.01); *G09G 2380/14* (2013.01)

(58) Field of Classification Search
CPC ........................... G06F 3/0483; G06F 15/0291
USPC ....................................................... 715/776
See application file for complete search history.

(56) References Cited

U.S. PATENT DOCUMENTS

| 5,463,725 A | 10/1995 | Henckel et al. |
| 7,717,344 B2 | 5/2010 | Rathus et al. |
| 2006/0133664 A1* | 6/2006 | Hong .................. G06F 3/0483 382/154 |

(Continued)

FOREIGN PATENT DOCUMENTS

| CN | 101923435 A | 12/2010 |
| JP | 07261725 A | 10/1995 |

(Continued)

OTHER PUBLICATIONS

International Search Report (PCT/ISA/210) issued on Jul. 11, 2012, by the Canadian Patent Office as the International Searching Authority for International Application No. PCT/IB2012/000598.

(Continued)

*Primary Examiner* — Haoshian Shih
(74) *Attorney, Agent, or Firm* — Buchanan Ingersoll & Rooney PC

(57) ABSTRACT

The present invention relates generally to three dimension modeled view of electronic documents. In particular, the present invention relates to a method of providing an user interface for simulating a forward and reverse page-turn of a 3-dimensional multiple-page electronic document. The present invention also relates to a method of providing an user interface for simulating a page-tear when deleting a page in an 3-dimensional multiple-page electronic document.

19 Claims, 5 Drawing Sheets

(56) References Cited

U.S. PATENT DOCUMENTS

2009/0219248 A1* 9/2009 Li .................. G06F 3/0483 715/776
2009/0237367 A1   9/2009 Ryu et al.
2010/0175018 A1   7/2010 Petschnigg et al.
2012/0096374 A1* 4/2012 Leskela ............ G06F 3/04883 715/764

FOREIGN PATENT DOCUMENTS

JP   2003140802 A   5/2003
JP   2006172465 A   6/2006

OTHER PUBLICATIONS

Written Opinion (PCT/ISA/237) issued on Jul. 4, 2012, by the Japanese Patent Office as the International Searching Authority for International Application No. PCT/IB2012/000598.

ISO 32000 1:2008 Document Management Portable document format Part 1:PDF 1.7, pp. 1-756.

Extended European Search Report issued Nov. 18, 2014 in corresponding European Application No. 12764872.3 (6 pages).

Extended European Search Report issued by European Patent Office on Nov. 14, 2014 in European Application No. 12764872 (6 pages).

* cited by examiner

METHOD FOR THREE-DIMENSIONAL VIEWING

RELATED APPLICATIONS

This application claims priority to 61/453,590, filed Mar. 17, 2011, which is herein incorporated by reference in its entirety

FIELD OF THE INVENTION

The present invention relates generally to three dimension modeled view of electronic documents.

BACKGROUND OF THE INVENTION

Portable document format (PDF) is an open standard for document exchange. PDF is a compact file format that provides a universally compatible means for electronically exchanging documents. To enhance user experience, an interactive viewer is desired.

SUMMARY OF THE INVENTION

It is an object of the present invention to provide a method for three dimensional viewing while maintaining native PDF format.

It is an object of the present invention to further provide a means to view native pdf format files in three dimensions without conversion to any other format.

It is an object of the present invention to further provide an easy switch between flat (two dimensions) and three dimension view modes.

It is an object of the present invention to further provide fast rendering of text and images.

It is an object of the present invention to further provide a means to convert any file to PDF and view it in three dimensions.

DETAILED DESCRIPTION

Embodiments of the present invention will be outlined in the general context of computer-executable instructions as program modules are performed by a personal computer. Program modules generally include routines, programs, objects, components, data structures, and the like, which perform certain tasks or implement particular abstract data types. One skilled in the art will appreciate that embodiments of the present invention can be practiced from other computer system configurations. Embodiments of the present invention can also be practiced in distributed computing environments where tasks are performed by remote processing devices, which are generally linked via a communications network. In a distributed computing environment, program modules can be located in both local and remote memory storage devices.

An alternative layout mode of electronic documents is provided herein. The electronic document is understood to mean a data set according to the standard ISO 32000 1:2008 for Document Management Portable document format Part 1: PDF 1.7. See for example the document located at: iso.org/iso/catalogue_detail.htm?csnumber=51502 on the World Wide Web. This document is herein incorporated in its entirety.

The standard stipulates the following layout modes:
Single Page: Display one page at a time
One Column: Display the pages in one column
Two Column Left: Display the pages in two columns, with odd-numbered pages on the left
Two Column Right: Display the pages in two columns, with odd-numbered pages on the right
Two Page Left: Display the pages two at a time, with odd-numbered pages on the left
Two Page Right: Display the pages two at a time, with odd-numbered pages on the right Described herein is a new layout mode of PDF documents, designed to imitate a printed book. In contrast to alternative display means, the present invention requires no deviation from a PDF format or document conversion, and remains within the standard specified above. It allows one to maintain the internal logic of the document, layout parameters, interactive elements and platform independence which are stipulated by the standard ISO 32000-1.

Pagination

Figure 1:
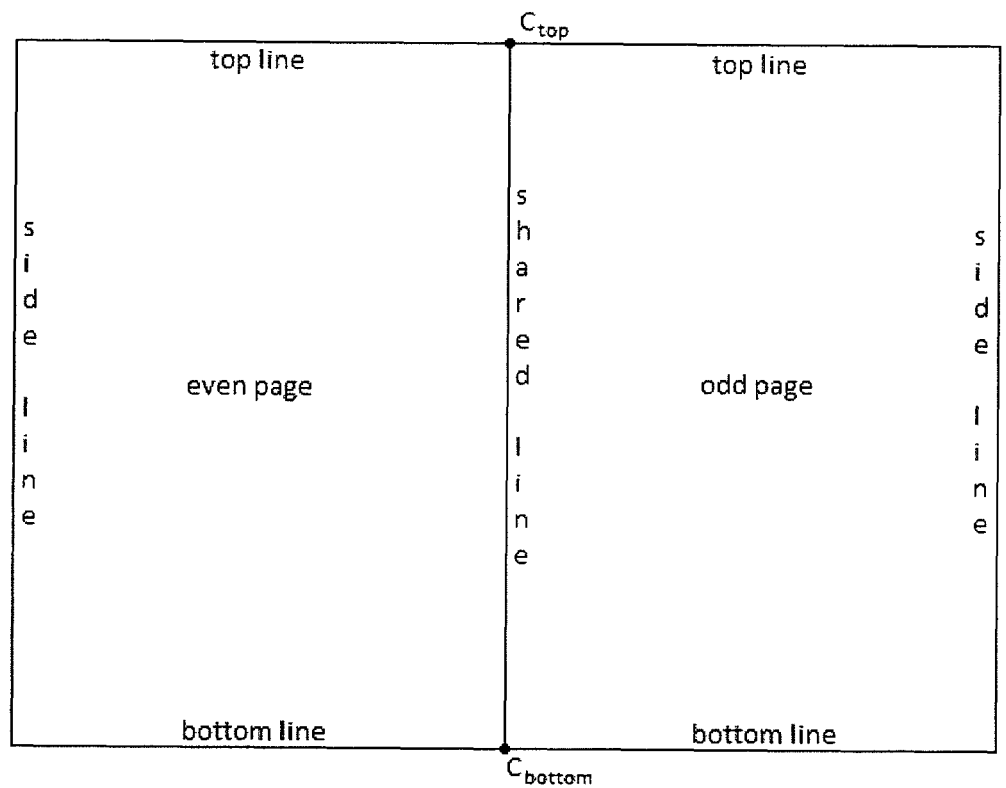
FIG. 1 illustrates an embodiment of a double page spread with related parameters.

In embodiments of the present invention, content of an electronic document is divided into pages. This division is carried out in accordance to the PageTree structure which is specified within the PDF standard. The PageTree structure defines ordering of pages within a document. The tree contains nodes of two type; intermediate nodes called page tree nodes, and leaf nodes called page objects. If pages of the document have different sizes, then a maximum size of a document page is determined. Afterwards, all pages of the document are modified according to the determined size. For instance, the content of a page is centered if a size of the page is increased. A data structure is formed using the pages of the document, which maintains the page display sequence. When arranging the page display sequence, double page spreads are formed using the pages in a manner similar to double page spread of a printed book. Pages included in a double page spread are in pairs, wherein even-numbered pages are located on the left side of a double page spread and odd-numbered pages are located on the right side of the double page spread (with page numbering starting with the page number one). Pages in a double page spread have a shared line, and each page has a top and a bottom line parallel to each other. The top and bottom lines on each page are perpendicular to the shared line. Each page has a side line which is parallel to the shared line, and perpendicular to the top and bottom lines. A double page spread and its parameters are illustrated in FIG. 1. As shown in FIG. 1, $C_{top}$ defines a top point of a shared line and $C_{bottom}$ defines a lower point of a shared line.

Page Turning

When moving between double page spreads, the "bending" of a page is achieved. The "bending" causes a visual effect of a page turning as if the user is turning a printed page or the page of a magazine. The "bending" supposes an organized method of page layout on the screen. In one embodiment of the present invention, "bending" of a page causes a visual effect that includes a curvature in the plane of the page.

Figure 2:
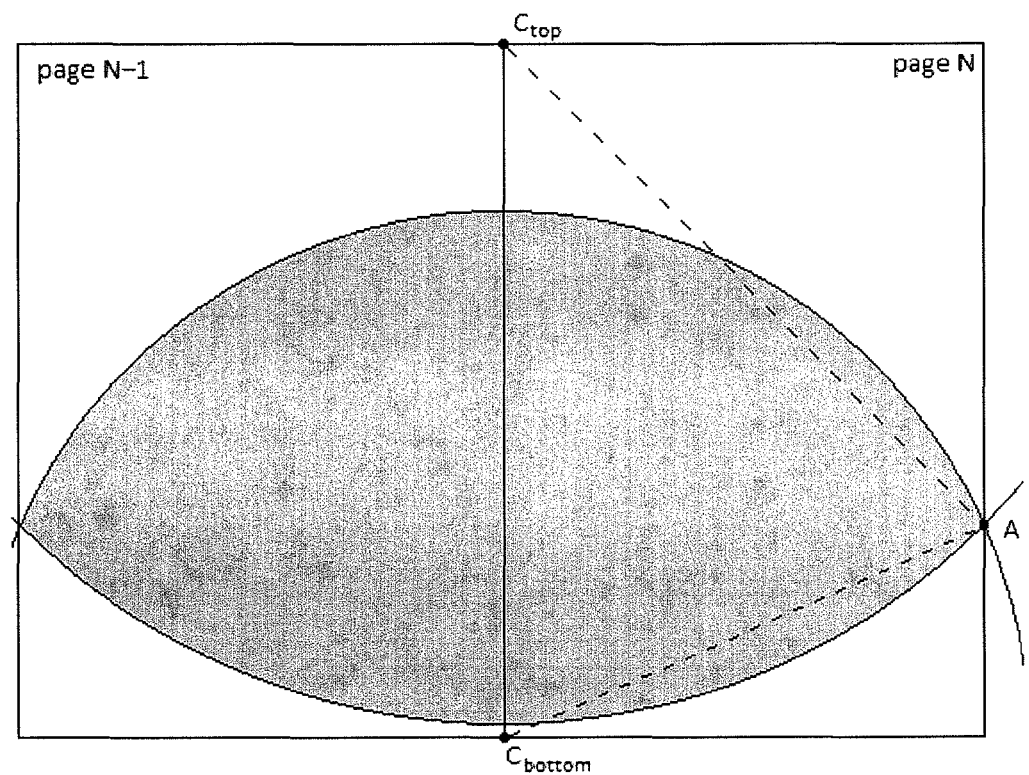
FIG. 2 illustrates point A.

FIG. 2 illustrates a screen displaying a double page spread with page numbers N−1 and N, wherein N is an odd number. As shown in FIG. 2, a reference point (Point A) is defined such that Point A is located on a side line of Page N. For example, to move from a double page spread having page numbers N−1 and N to a double page spread having page numbers N+1 and N+2, Point A can be moved within boundaries of an area (hereinafter referred to as "turning boundaries") defined by an intersection of two arcs. One arc has a radius which is equal to the length of a segment $AC_{top}$ and is centered at Point $C_{top}$. A second arc has a radius which is equal to the length of a segment $AC_{bottom}$ and is centered at Point $C_{bottom}$. This area defined by an intersection of two arcs is such that the location of a shared line and the lengths of the top and the bottom lines remain the same when "bending" the page.

Figure 3:
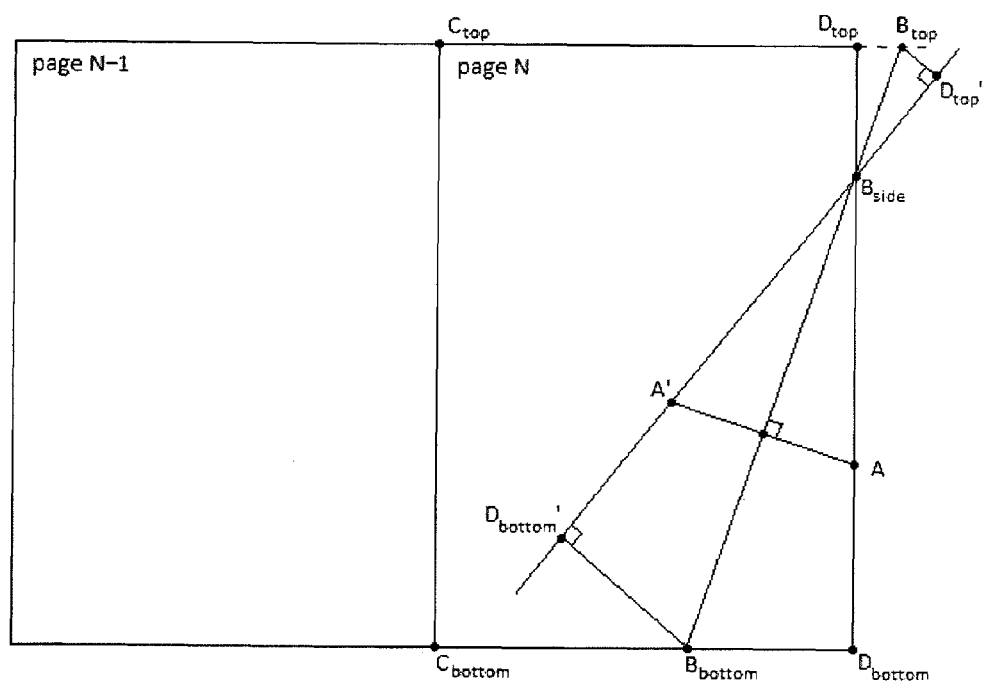
FIG. 3 illustrates moving from point A to point A'.

A second reference point (Point A'), as shown in FIG. 3, is selected such that it is located within the area defined by the turning boundaries. During a page "bending" process, a visual effect of moving a page is provided in manner that moves Point A to Point A'. In some embodiments of the present invention, Points A and A' can be specified programmatically. In other embodiments of the present invention, Points A and A' can be specified by a user via a mouse or touch screen. Specification of Points A and A' by the user ensures an interactive cooperation of a user and a page and lends more elements of realism to the page-turning process.

Movement from Point A to Point A' is illustrated in FIG. 3 and is accomplished as below:
  Identify a center of segment AA'
  Draw a perpendicular line to the center of segment AA'.
  Determine points of intersections of the perpendicular line to the center of segment AA' with the top (point $B_{top}$), bottom (point $B_{bottom}$) and side (point $B_{side}$) lines of the Page N.
  Draw a straight line through Points A' and $B_{side}$
  Drop a perpendicular line from Points $B_{top}$ to the straight line A'$B_{side}$ and from $B_{bottom}$ to the straight line A'$B_{side}$.
  Points of intersection of the perpendicular lines with the straight line A'$B_{side}$ are $D_{top}$' and $D_{bottom}$' respectively.
The above steps determines points to which corners of a page can be moved, such that Point A moves to Point A'. Corners of a page are moved to Points $D_{top}$ and $D_{bottom}$, which are top and bottom points of a side line of the Page N.

Figure 4:
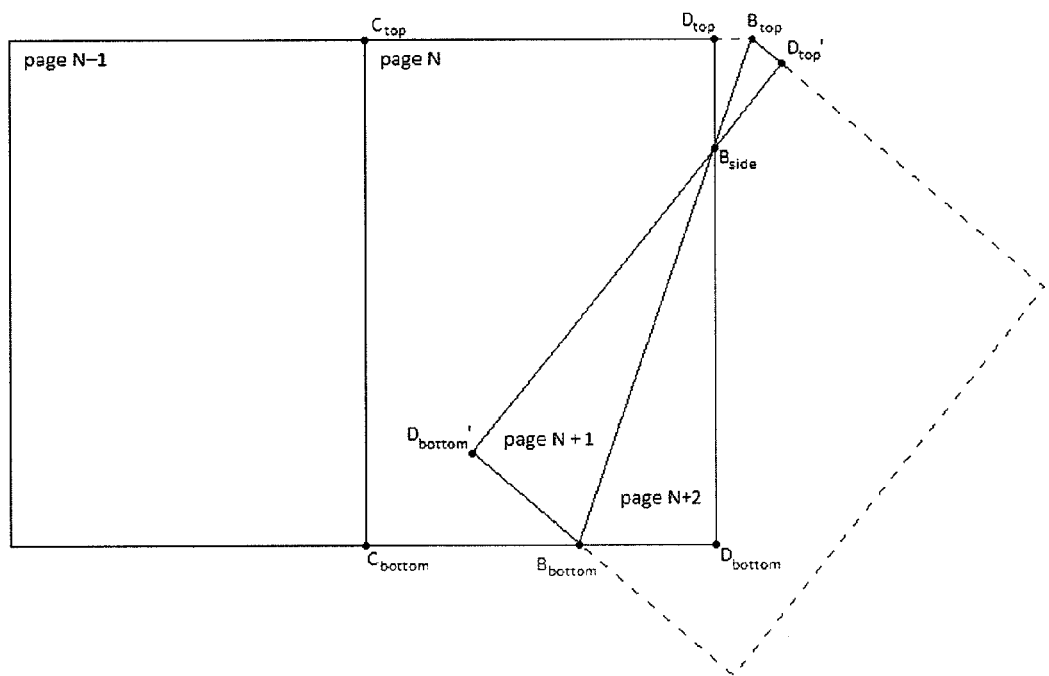
FIG. 4 illustrates limitation of page content.

When Point A moves to Point A' layout of Pages N–1 and N remain the same, but a portion of Page N+2 content is overlaid on a portion of page N. Portions of Page N+2 content overlaid on page N is limited to the area defined by figure $B_{top}D_{top}D_{bottom}B_{bottom}$ (FIG. 4). Page N+1 is located in a manner such that its side line coincides with the segment $D_{top}$'$D_{bottom}$'. Page N+1 is an even-numbered page, which means that its left line is a side line. Contents from page N+1 are limited to and displayed in an area defined by figure $B_{top}D_{top}$'$D_{bottom}$'$B_{bottom}$ (FIG. 4). The contents of the pages are displayed on a display screen (or any other device).

To display the contents of pages on the screen it is necessary to determine transformation from a coordinate space of the page into a coordinate space of the output device. The method in accordance with an embodiment of the present invention, as described above, is used for this purpose. To display the page on a screen contents are read from an electronic document. The contents of a page are a sequence of operators and operands, which define graphical objects for display. A comprehensive description of these objects is given within the PDF standard. However, methods of their transformation into an image on the screen (rasterization) are not limited by the standard. Implementation these algorithms can be performed using the graphics processing unit, which allows to significantly reduce response time to user actions. Rasterization algorithms are well known in this field and are not a part of this invention.

A complete page-turn can be accomplished when Point A' is located on the side line of Page N–1. When a complete page-turn is performed, the current double page spread, which contains Pages N–1 and N, is replaced with the next double page spread which contains Pages N+1 and N+2.

Reverse Page Turning

For a reverse page-turn, a process similar to the page "bending" process discussed above for Page N can be applied to the Page N–1. To apply a "bending" process for Page N–1, references to Page N, Page N+1 and Page N+2 are replaced with Page N–1, Page N–3 and Page N–2 respectively.

To move from the double page spread N–1 and N to the double page spread with page numbers N–3 and N–2, Point A is selected such that it is located on the side line of page N–1 and such that Point A moves only within boundaries of an area defined by an intersection of two arcs. One arc has a radius which is equal to the length of a segment $AC_{top}$ and is centered at the Point $C_{top}$. A second arc has a radius that is equal to the length of a segment $AC_{bottom}$ and is centered at the Point $C_{bottom}$. A second reference point (Point A') is selected such that it is located within the area defined by the boundaries. In the course of a "bending" process, a visual effect of moving a page is created in a manner such that Point A moves to Point A'. To move the Point A to the Point A', center of a segment AA' is selected. A perpendicular line is then drawn from this point to the top (Point $B_{top}$), bottom (Point $B_{bottom}$) and side (Point $B_{side}$) lines of the Page N–1. A straight line is drawn through Points A' and $B_{side}$. A perpendicular line is drawn from the Points $B_{top}$ and $B_{bottom}$ to the straight line drawn through Points A' and $B_{side}$, and the Intersection points are identified as $D_{top}$' and $D_{bottom}$' respectively. $D_{top}$ and $D_{bottom}$ are respectively the top and the bottom lines of the side line of the page N–1. The above steps determines points to which the page corners can be moved such that Point A moves to Point A'.

Next, organization of a mutual page layout is determined. Layout for Pages N–1 and N remain the same. A portion of Page N–3 is overlaid on Page N–1, however the content of Page N–3 overlaid on Page N–1 is limited to and defined by figure $B_{top}D_{top}D_{bottom}B_{bottom}$ (FIG. 4). Page N–2 is located in such a way that its side line coincides with the segment $D_{top}$'$D_{bottom}$'. As illustrated herein, Page N–2 is an odd page, which means its side line is a right line. Content from page N–2 are limited to and defined by figure $B_{top}D_{top}D_{bottom}B_{bottom}$ (FIG. 4). The content of the pages are displayed on a display screen (or any other device). A complete reverse page-turn can be accomplished when Point A' is located on the side line of Page N. When a complete reverse page-turn is performed, the current double page spread, which contains Pages N–1 and N, is replaced with the next double page spread that contains Pages N–2 and N–3.

Removing a Page

Moving Point A beyond the aforementioned area defined by turning boundaries will result in the page being completely or partially separated from the shared line. This will create an effect of page being "torn" out of a book. Such "tearing" of a page may be useful to simulate a page deletion from a document.

Visual Effects

Creating different interactive effects is possible by manipulating the position of Points A and A', thereby allowing the system to react to User's actions. The basis of such effects is a smooth animation of the Point A' position.

Points $F_0$ and $F_1$ are selected to create a page animation. These points can be chosen arbitrarily within the area defined by the turning boundaries. Vector $\overline{F_0F_1}$, starting at point $F_0$ and ending at point $F_1$, determines the direction and boundaries to move point A'. The process of gradual movement of the point A' from point $F_0$ to point $F_1$ is called an animation cycle. Exemplary steps to carry out the animation cycle are provided below:

a. Point A' is chosen so that its position coincides with $F_0$
b. organization of the page layout is performed by the algorithm described above and it is displayed on the screen.
c. position of point A' is changed to the value $$\frac{\overline{F_0 F_1}}{|\overline{F_0 F_1}|} \cdot S,$$

where S is a scalar value of the Point A' movement speed. The scalar value is arbitrarily chosen and it must be larger than 0.

d. steps 2-3 are carried out until the position of point A' goes beyond segment $F_0 F_1$
e. Point A' is chosen in a manner such that its position coincides with $F_1$
f. organization of a page layout and rendering are carried out The choice of point A is made in advance and is not part of this page animation process. The animation cycle can be interrupted at any step to ensure rapid response to user actions. As a result of this process, a user can see a gradient movement of a document page.

Animation effects can include for example a "Dancing" corner. This animation effect will be realized in such a way that one of the page corners will smoothly bend and unbend within certain time periods. This effect can be used for different notifications. For instance, a dancing corner can be used to notify a User that a book that is displayed on the screen is an interactive element. Steps related to this visual effect include: identifying one of the tops of a side line of a page as Point A. The Point $F_0$ is chosen equal to the Point A. The Point $F_1$ is selected within the limits of the turning boundaries of the Point A. The turning boundaries are described in the Page Turning algorithm. During the animation cycle Point A' gradually moves from the Point $F_0$ to the Point $F_1$. Upon completion of each cycle, Points $F_0$ and $F_1$ swap their original positions with each other and the animation cycle repeats until the User interrupts the process. The animation cycle may be interrupted by the other methods as well. For example, it is possible to set the number of cycles or to set time during which the animation cycle will be carried out.

Another example of animation is page-turning animation. This effect allows one to visualize a quick shift between the double page spreads of a book. To create page-turning animation Point A is chosen on a side line of a page. The Point $F_0$ is chosen equal to the Point A. A perpendicular is selected on a side line through the Point A. Point $F_1$ is selected at the point of intersection of this perpendicular with a side line of the other page. The animation cycle is carried out. Upon completion of this animation cycle, a page is completely turned over and the viewed double page spread is changed. A user input may start the animation cycle. However, it may also be carried out in certain periods of time as well; for example, allowing a user to watch how a book is being "thumbed" automatically.

Animation may be initiated or terminated through user influence on a page. For example, influence can be passive or active. The type of influence will differ depending on various input devices. For example, with a computer mouse, an example of passive influence would include moving the mouse pointer over the page, an example of active influence would include moving the mouse pointer over the page holding down the mouse key. Active and passive influence can be provided using other devices of a user input such as those known by one of ordinary skill in the art and including for example a touch-screen, a joystick, and the like.

The types of interaction may be transformed into each other. For example, using the above illustration of a computer mouse, if a user holds down a mouse key when moving the mouse pointer over the page, then the passive influence is transformed into the active one. And vice versa, if a user stops holding down the mouse key when moving the mouse pointer over the page, then the active influence is transformed into the passive one.

When a user exerts influence on a page, the Point $F_1$ coincides with the point of influence. A perpendicular is selected on a side line of a page from the Point $F_1$. Point $F_0$ is selected at the point of intersection of this perpendicular with a side line. Point A is selected in the same position. When changing the point of influence, the Point F1 is moving to the point of influence, the Point $F_0$ is moving to an existing position of the Point A'. If changing takes place during the animation process, then this process is interrupted and a new animation cycle is carried out. Such operations are carried out until the influence is terminated. The perception to the user is a screen having a page moving following the mouse pointer. Thus, to the user it seems as if one is moving the page of a real book when pulling the page corner with the user's hand.

Upon completion of passive influence, the Point $F_0$ is chosen in the Point A' position, and the Point $F_1$ is chosen in the Point A position. The animation cycle is carried out.

When the active influence stops, two outcomes are possible depending on the location of that influence. If the point of influence is stopped on the same page as where the active influence started, the pages return to the state that they were in before the active influence started. If the point of influence is stopped on a subsequent page (the shared line is crossed) the page returns to the subsequent page of the double page spread. If the point of influence is stopped on a previous page (the shared line is crossed) the page returns to the previous page of the double page spread.

Upon completion of active influence, two results are possible. If the point of influence is located above the page upon which influence is being exerted at the moment when the influence is finished, then such actions are carried out which are analogous to the passive influence termination. Otherwise, the Point $F_0$ is chosen from the Point A' position, and the Point $F_1$ is chosen at the point of intersection of a side line of an inactive page with the perpendicular dropped from the Point A. This leads to the shifting of a current double page spread.

Figure 5:
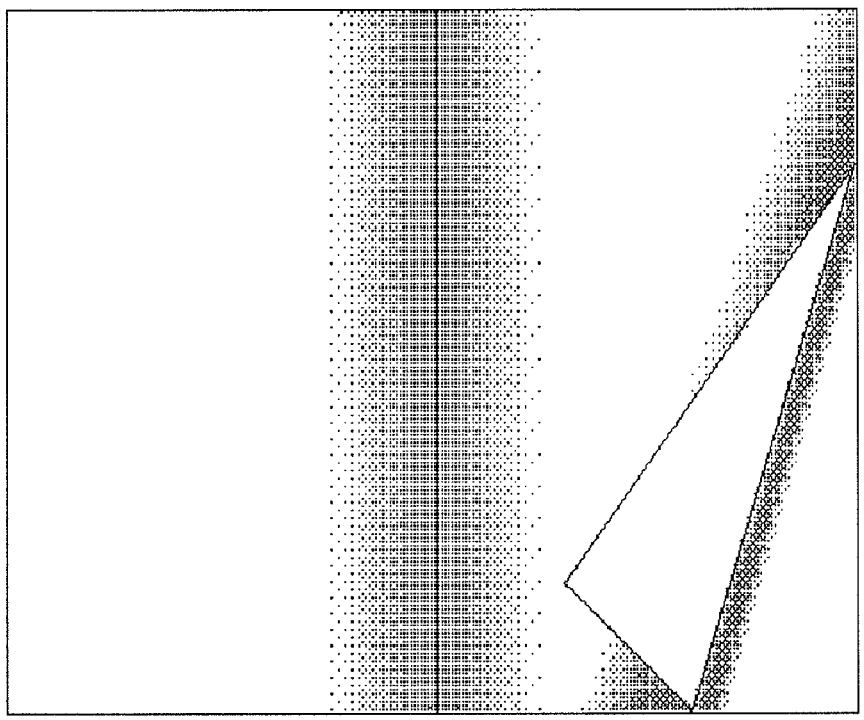
FIG. 5 illustrates an exemplary layout variant indicating the direction of the gradients going from transparent to black

Dynamic shading can be used to lend a book or document more realistic elements through the use of shadows. One variant of creating a shadow effect is filling with a linear gradient going from transparent to black. FIG. 5 illustrates exemplary layout variants indicating the direction of the gradients going from transparent to black.

Some embodiments have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention. For example, when moving the page corner abruptly holding down the mouse key, a user can imitate wavy bends of a page.

Furthermore, embodiments of the Three-Dimensional Viewer: Method, System and Apparatus can be implemented in hardware and/or software using any known or later developed systems or structures, devices and/or software by those of ordinary skill in the applicable art from the functional description provided herein and with a general basic knowledge of the information technology arts pertaining to electronic documents.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention and any equivalent thereto. It can be appreciated that variations to the present invention would be readily apparent to those skilled in the art, and the present invention is intended to include those alternatives. Further, since numerous modifications will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of providing a user interface for simulating a page-turn of a printed multiple-page document, said method comprising the steps of:
    displaying a multiple-page document on a display to a user, wherein the multiple-page document is displayed as a double-page spread of a first page and a second page, wherein the double-page spread comprises a shared page boundary between the first page and the second page;
    receiving a request for a page-turn on the multiple-page document, wherein the request for the page-turn comprises a pointer to a first location on the shared page boundary;
    defining a first turning boundary spanning the first page and the second page, wherein the first turning boundary is defined by an arc having a radius defined by a distance between the first location and a top location of the shared page boundary, wherein the top location is the center of the arc defining the first turning boundary;
    defining a second turning boundary spanning the first page and the second page, wherein the second turning boundary is defined by an arc having a radius defined by a distance between the first location and a bottom location of the shared page boundary, wherein the bottom location is the center of the arc defining the second turning boundary, wherein the first turning boundary and the second turning boundary intersect to define a turning area;
    tracing a movement of the pointer from the first location to a second location within the turning area; and
    providing a visual effect of bending the shared page boundary along the traced movement from the first location to the second location.

2. The method of claim 1, wherein providing the visual effect of bending the second page comprises the steps of:
    identifying a midpoint between the first location and the second location;
    defining a third location on a side boundary of the second page and a fourth location on a bottom boundary of the second page, wherein a straight line between the third location and the fourth location is perpendicular to a straight line defined between the first location and the second location, wherein the straight line between the third location and the fourth location intersects the straight line between the first location and the second location;
    determining a fifth location along a line traversing a top boundary of the second page, wherein the straight line between the third location and the fourth location intersects the fifth location;
    determining a sixth location within the turning area and a seventh location outside the second page, wherein a straight line through the second location, the third location, the sixth location and the seventh location is perpendicular to a straight line through the fourth location and the sixth location, wherein the straight line through the second location, the third location, the sixth location and the seventh location is perpendicular to a straight line through the fifth location and the seventh location;
    moving a bottom corner of the second page to the sixth location;
    overlaying a portion of a third page within an area defined by boundaries having the third location, the fourth location and the sixth location as vertices; and
    overlaying a portion of a fourth page within an area defined by boundaries having the bottom corner, the third location and the fourth location as vertices.

3. The method of claim 1, wherein the visual effect of bending the second page boundary comprises a curvature in a plane of the second page.

4. The method of claim 1, wherein the multiple-page document is an electronic document.

5. The method of claim 1, wherein the shared page boundary between the first page and the second page represents a spine edge of the multiple-page document.

6. The method of claim 2, wherein the moving the bottom corner of the second page to the sixth location comprises movement of the bottom corner at a constant speed.

7. The method of claim 2, wherein the moving the bottom corner of the second page to the sixth location comprises movement of the bottom corner at a variable speed.

8. A method of providing a user interface for simulating a reverse page-turn of a printed multiple-page document, said method comprising the steps of:
    displaying a multiple-page document on a display to a user, wherein the multiple-page document is displayed as a double-page spread of a first page and a second page, wherein the double-page spread comprises a shared page boundary between the first page and the second page, wherein the first page is positioned on a left side of the double-page spread;
    receiving a request for a reverse page-turn on the multiple-page document, wherein the request for the reverse page-turn comprises a pointer to a first location on the shared page boundary;
    defining a first turning boundary spanning the first age and the second page, wherein the first turning boundary is defined by an arc having a radius defined by a distance between the first location and a top location of the shared page boundary, wherein the top location is the center of the arc defining the first turning boundary;
    defining a second turning boundary spanning the first page and the second page, wherein the second turning boundary is defined by an arc having a radius defined by a distance between the first location and a bottom location of the shared page boundary, wherein the bottom location is the center of the arc defining the second turning boundary, wherein the first turning boundary and the second turning boundary intersect to define a turning area;
    tracing a movement of the pointer from the first location to a second location within the turning area; and providing a visual effect of bending the shared page boundary along the traced movement from the first location to the second location.

9. The method of claim 8, wherein providing the visual effect of bending the first page comprises the steps of:
identifying a midpoint between the first location and the second location;
defining a third location on a side boundary of the first page and a fourth location on a bottom boundary of the first page, wherein a straight line between the third location and the fourth location is perpendicular to a straight line defined between the first location and the second location, wherein the straight line between the third location and the fourth location intersects the straight line between the first location and the second location;
determining a fifth location along a line traversing a top boundary of the first page, wherein the straight line between the third location and the fourth location intersects the fifth location;
determining a sixth location within the turning area and a seventh location outside the first page, wherein a straight line through the second location, the third location, the sixth location and the seventh location is perpendicular to a straight line through the fourth location and the sixth location, wherein the straight line through the second location, the third location, the sixth location and the seventh location is perpendicular to a straight line through the fifth location and the seventh location;
moving a bottom corner of the first page to the sixth location;
overlaying a portion of a third page within an area defined by boundaries having the third location, the fourth location and the sixth location as vertices; and
overlaying a portion of a fourth page within an area defined by boundaries having the bottom corner, the third location and the fourth location as vertices.

10. The method of claim 8, wherein the visual effect of bending the first page boundary comprises a curvature in a plane of the first page.

11. The method of claim 8, wherein the multiple-page document is an electronic document.

12. The method of claim 8, wherein the shared page boundary between the first page and the second page is a spine edge of the multiple-page document.

13. The method of claim 9, wherein the moving the bottom corner of the second page to the sixth location comprises movement of the bottom corner at a constant speed.

14. A method of providing a user interface for simulating a page-tear of a printed multiple-page document, said method comprising the steps of:
displaying a multiple-page document on a display to a user, wherein the multiple-page document is displayed as a double-page spread of a first page and a second page, wherein the double-page spread comprises a shared page boundary between the first page and the second page;
receiving a request from a user for a page-tear on the multiple-page document, wherein the request for the page-tear comprises a pointer to a first location on the shared page boundary;
defining a first turning boundary spanning the first page and the second page, wherein the first turning boundary is defined by an arc having a radius defined by a distance between the first location and a top location of the shared page boundary, wherein the top location is the center of the arc defining the first turning boundary;
defining a second turning boundary spanning the first page and the second page, wherein the second turning boundary is defined by an arc having a radius defined by a distance between the first location and a bottom location of the shared page boundary, wherein the bottom location is the center of the arc defining the second turning boundary, wherein the first turning boundary and the second turning boundary intersect to define a turning area;
tracing a movement of the pointer from the first location to a second location outside the turning area; and
providing a visual effect of tearing the second page.

15. The method of claim 14, wherein providing the visual effect of tearing the second page comprises the steps of:
moving a bottom corner of the second page to the second location;
separating a bottom location of the second page from the shared page boundary;
overlaying a portion of a third page within an area defined by boundaries having the bottom corner, the bottom location of the second page and the second locations as vertices; and
overlaying a portion of a fourth page within an area defined by boundaries having the bottom corner, the bottom location of the shared page boundary and the second location as vertices.

16. A method of providing a user interface for simulating page animation of a printed multiple-page document, said method comprising the steps of:
displaying a multiple-page document on a display to a user, wherein the multiple-page document is displayed as a double-page spread of a first page and a second page, wherein the double-page spread comprises a shared boundary between the first page and the second page;
detecting a pointer to a first location on the second page boundary;
defining a first turning boundary spanning the first page and the second page, wherein the first turning boundary is defined by an arc having a radius defined by a distance between the first location and a top location of the shared page boundary, wherein the top location is the center of the arc defining the first turning boundary;
defining a second turning boundary spanning the first page and the second page, wherein the second turning boundary is defined by an arc having a radius defined by a distance between the first location and a bottom location of the shared page boundary, wherein the bottom location is the center of the arc defining the second turning boundary, wherein the first turning boundary and the second turning boundary intersect to define a turning area;
tracing a movement of the pointer from the first location to a second location within the turning area; and
moving the second location to a third location while tracing the movement of the pointer from the first location to the second location, wherein the second location is moved to the third location at a predetermined speed.

17. The method of claim 16, further comprising the step of:
receiving a request to stop animation, wherein the request comprises a stop location; and moving the second location to the stop location.

18. The method of claim 16, wherein the moving the second location to the third location creates an animation of page-turning.

19. The method of claim 16, wherein the moving the second location to the third location creates an animation of dancing page-corner.

\* \* \* \* \*